United States Patent Office 3,044,299
Patented July 17, 1962

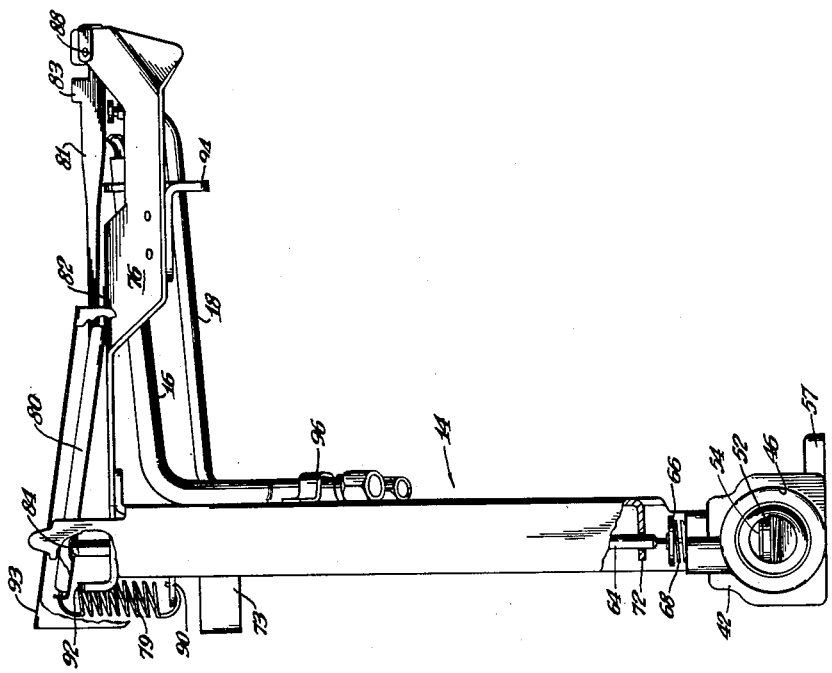

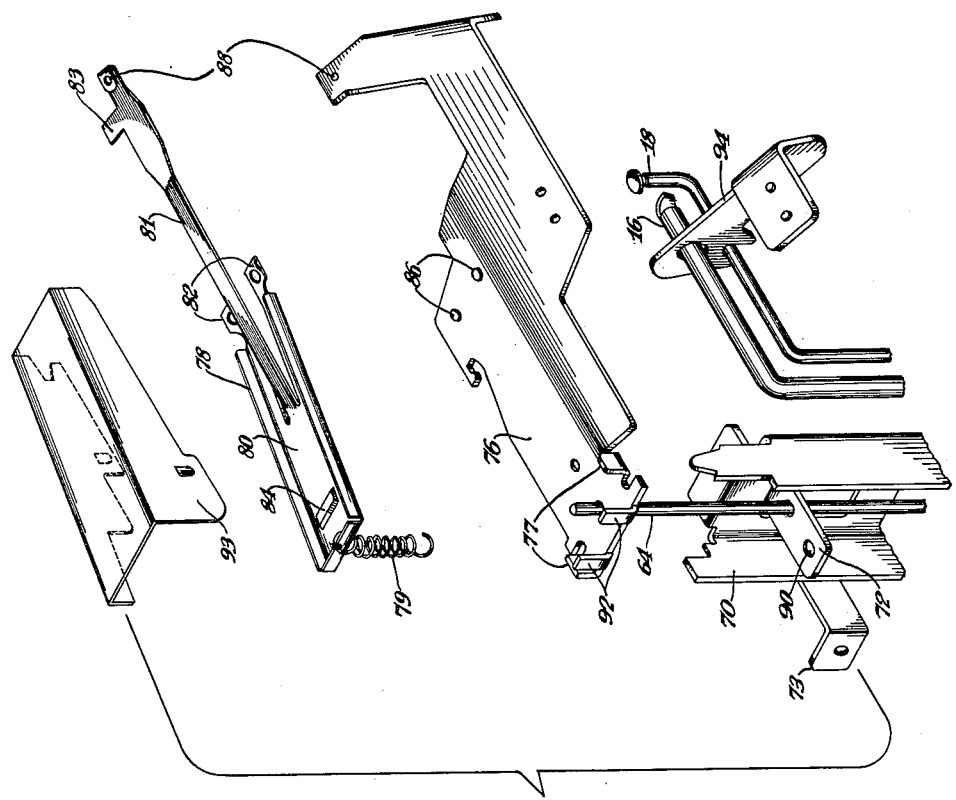

3,044,299
AUTOMATIC CONTROL DEVICE
Victor Weber, Charles D. Branson, and James F. Beal, Greensburg, Pa., assignors to Robertshaw-Fulton Controls Company, Richmond, Va., a corporation of Delaware
Filed Feb. 5, 1958, Ser. No. 713,401
4 Claims. (Cl. 73—363)

This invention relates to automatic control devices for heating appliances such as gaseous fuel burners of the type used as oven or broiler burners of domestic cooking ranges.

Automatic burner lighting systems are employed on modern domestic gas ranges to provide convenient means of burner ignition. In these lighting systems wherein a pilot light is constantly burning in an oven, all that the operator of the gas range need do is turn the oven thermostat adjusting dial to a pre-selected temperature and burner ignition and control is thereafter automatic. To accomplish this, the majority of these systems employ automatic control devices in the form of a valve to control the main flow of gas from the thermostat to the oven burner and to provide flame failure control in the event of pilot light failure or outage. The automatic valve must be inherently rapid in response, particularly with respect to opening, so that prompt lighting will occur. In some of these systems, wherein a thermo-mechanical valve is employed, the valve and the valve operating means are directly associated with the burner and subjected to the high ambient temperatures of the boiler or oven compartment of the gas range. Because of the high ambient temperatures on the valve and the valve operating mechanism, prior art devices of the thermo-mechanical type have not been entirely satisfactory.

An object of this invention is an automatic control device capable of operating rapidly and dependably at high ambient temperatures.

Another object of this invention is to eliminate the load on a valve operating mechanism when it is in a highly heated condition.

Still another object of this invention is to adapt a control device readily to any heating appliance.

This invention comprises a control device of the type which is responsive to a source of heat and which has a control means operable between positions for controlling the flow of operative energy. The control means are operated by an operator in the form of a rod which is movable in two directions and which is actuated for movement in at least one of these directions by a movable lever member. The movable lever member is operated between positions and it engages the rod in at least one of these positions to cause movement thereof. Means in the form of a thermal element operatively engage the movable lever member for moving it between control positions in response to temperature variations of the source of heat thereby controlling the flow of operative energy through the control means.

The foregoing and all other features, objects, and advantages will become apparent from the following description taken in connection with the accompanying drawings, wherein:

FIG. 3 is a side elevation view of the automatic control device of this invention shown in partial section;

FIG. 4 is a front elevation view of the automatic control device of this invention with some of the parts shown broken away;

FIG. 5 is an exploded perspective view of the operating mechanism of the automatic control device with associated parts therefor.

For purposes of better understanding the automatic control device, an oven burner system with which it may be used will be first described.

Figure 1:
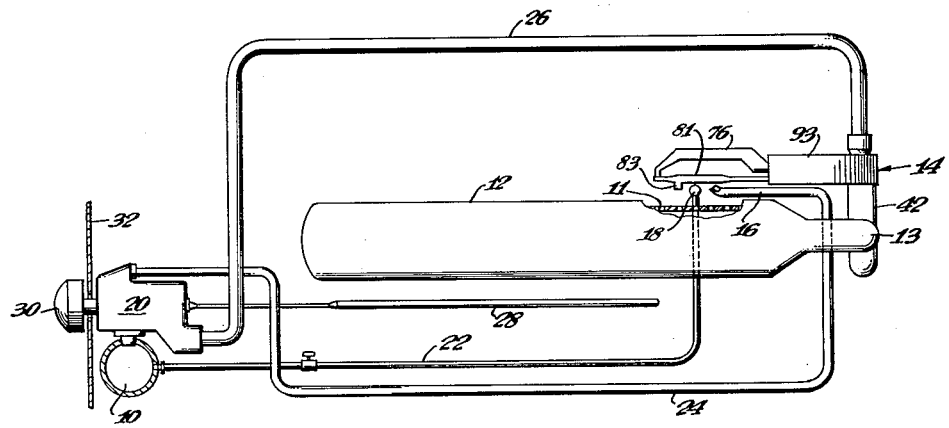
FIG. 1 is a schematic view of an oven burner lighting system utilizing the automatic control device of this invention.

Referring to FIG. 1, this system includes a gas supply manifold indicated generally at 10, a burner 12, an automatic control device 14, and a thermostatic valve unit 20 for controlling and regulating the flow of gas from the manifold 10 to the burner 12. In normal operation, the burner 12 and the automatic control device 14 would be disposed in an oven chamber, not shown. A constantly burning standby pilot or burner 18 is mounted on the control device 14 and is connected through a conduit 22 to the manifold 10. An igniter pilot 16 is mounted on the control device 14 and is connected to the manifold 10 through a conduit 24 and a thermostatic valve 20 is mounted on the manifold 10 in communication therewith. The burner 12 does not constitute a part of this invention but may take the form of any one of a number presently on the market. For purposes of illustration, the burner 12 is in the form of a generally rectangular oven burner having a plurality of peripheral ports 11 and a mixing tube 13 disposed at a right angle thereto. The burner 12 is connected to the manifold 10 through the mixing tube 13, the automatic control device 14, and a conduit 26 in communication with the thermostatic valve 20.

The thermostatic valve 20 may be of any conventional construction. In general, the valve 20 is shown to include a manually operable control knob 30 associated therewith and accessible from the front of the range, a front wall of which is generally indicated at 32. The knob 30 is adapted to control the opening and closing of the thermostatic valve and to determine the temperature at which an oven is to be heated. A temperature responsive bulb 28 is mounted in the oven and connected to the valve 20 to control operation thereof and to maintain a predetermined temperature. Normally the knob 30 is biased outwardly of the range wall 32 so that it must first be depressed before it can be rotated. When the knob 30 is rotated and set at the predetermined temperature to be maintained in the oven, the valve 20 will permit gas to flow through conduits 24 and 26 to the automatic control device 14 and the igniter pilot 16.

Figure 2:
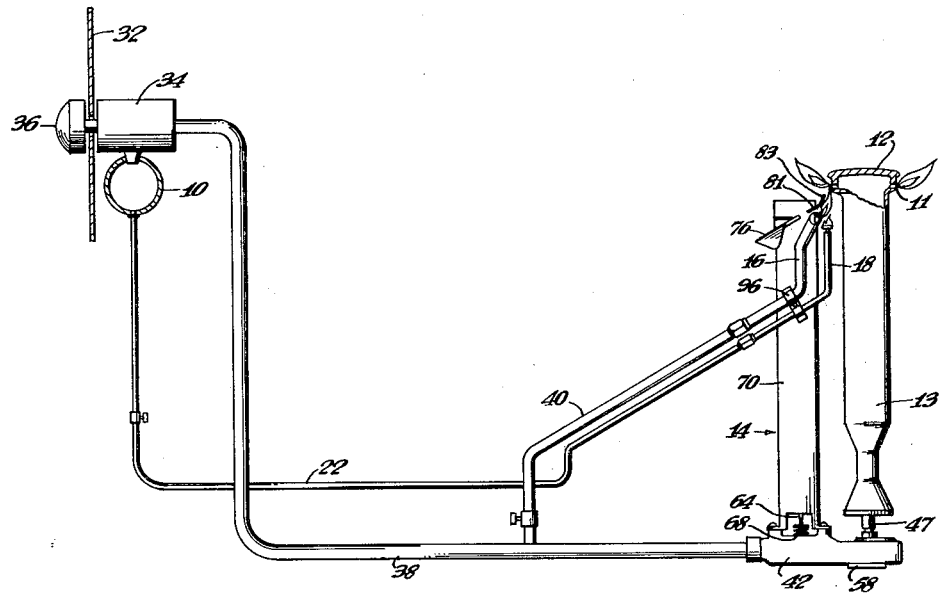
FIG. 2 is a view similar to FIG. 1 showing a boiler burner lighting system.

In the broiler burner control system shown in FIG. 2, the thermostatic valve 20 has been replaced by a gas cock or valve 34. The gas cock 34 can be of any conventional design and is shown adapted to be moved between the open and closed positions by a manually operable knob 36. When knob 36 is rotated, moving the gas cock 34 to the open position, gas from the manifold 10 is admitted to a conduit 38, which is in direct communication with the control device 14, and a branch conduit 40, which communicates with igniter pilot 16. The standby pilot 18 is adapted to be constantly burning and it communicates with gas manifold 10 through a conduit 22.

As is best seen in FIGS. 3 and 4, the automatic control device 14 includes a control unit in the form of a valve casing 42 having a threaded outlet opening 44 and a threaded inlet opening 46 to which the fuel conduits 26 (FIG. 1) or 38 (FIG. 2) can be connected. A burner cap 47, having therein an adjustable burner orifice is threaded into outlet 44 and provides means for adapting outlet 44 to make connection with a hole in the end of the burner mixing tube 13. A valve chamber 48 is formed in the casing 42 intermediate the inlet 46 and the outlet 44 and is provided with an annular valve seat 50 intersecting the passage between the inlet 46 and the outlet 44.

A valve member 52 is positioned in the chamber 48 and is movable between open and closed positions relative to the valve seat 50 for controlling the flow of fuel through the valve casing 42. A compressed spring 56 is positioned in the chamber 48 between the valve member 52 and a threaded plug 58 for biasing the valve member 52 toward engagement with valve seat 50 and thus to its closed position. A facing material 54 is located on that face of valve member 52 which makes engagement with valve seat 50 providing tight sealing against leakage. A foot 57 is made integral with casing 42 and is provided for mounting the control device 14 in an oven or other appliance.

The valve member 52 is operable by a valve stem 60 extending outwardly of chamber 48 through an aperture 62 provided in a boss formed on the valve casing 42 axially of the valve seat 50. The end of stem 60 within chamber 48 is engageable with valve member 52 and the other end thereof is in abutment with the lower end of an operating rod 64. Valve stem 60 can be made integral with operating rod 64 but it is illustrated as operable independently of it. A circular retaining member 66 is fastened near that end of stem 60 in abutment with operating rod 64 and a compressed return spring 68 is positioned about stem 60 between retaining member 66 and casing 42 to normally bias stem 60 away from engagement with valve member 52 and into abutment with the lower end of operating rod 64.

An elongated substantially channel-shaped riser or support member 70 having thereon a pair of guide bearings 72 acts as a housing and support for the elongated operating rod 64. Operating rod 64 is freely slidable longitudinal of the member 70 in guide bearings 72, when acted upon in a manner to be hereinafter described. One end of member 70 is rigidly secured to valve casing 42, as by machine screws 74, so that operating rod 64 is supported in axial alignment with valve stem 60. A foot 73 is made integral with support member 70 to provide additional means for mounting the control device 14 in an oven or other appliance.

As best illustrated in FIG. 5, a substantially C-shaped mounting plate 76 is integrated with member 70 by spot welding up-turned tabs 77 to the free end of member 70 in such a manner that the horizontal or top surface of plate 76 will be in a plane substantially perpendicular to the plane of support member 70. Plate 76 constitutes the mounting means for an element 78 and a biasing or power spring 79.

Element 78 can be made from any suitable metal by any suitable method, such as a combined punching and bending operation, to form an arm portion 80 and a ribbon extension portion 81. The arm portion 80 is in the form of a lever member which is substantially flat with upturned edges to provide rigidity, two tang-like extensions 82, and an indented portion 84. Tang-like extensions 82 are fastened as by spot welding to locating bosses 86 on plate 76, thus providing a hinged or flexible attachment of lever 80 to plate 76. The ribbon extension portion 81 is in the form of a thermally responsive element with a widened portion intermediate its ends and with a tab 83, the purpose of which will be hereinafter described made integral therewith. The free end of ribbon extension 81 is wrapped around and secured to the free end of the C-shaped mounting plate 76. Prior to being secured to plate 76, as by spot welding at 88, ribbon 81 is pulled sufficiently to raise the free end of lever 80 above the horizontal or top surface of plate 76. It has been found that the most satisfactory operation is obtained when the free end of lever 80 is raised to a point where an angle of from 8° to 9° is formed between lever 80 and the top surface of plate 76.

A biasing or power spring 79 adapts an indented portion 84 of lever 80 to engage the upper end of operating rod 64 thus adapting rod 64 to be operated by movement of lever 80. Spring 79 has one end hooked into a suitable hole in the free end of lever 80 and the other end hooked into a spring hook 90 provided in the guide bearing 72 located nearest to plate 76. Spring 79 is tensioned between lever 80 and spring hook 90 and urges lever 80 into engagement with two upturned tabs or stop lugs 92 on plate 76 and the indented portion 84 of lever 80 into engagement with the upper end of operating rod 64.

The elements mounted on plate 76 are protected by a snap-on cover 93 which engages the edges of plate 76 and a portion of support member 70 in a manner to locate and secure it in an effective position.

A tubular igniter pilot 16 and a tubular standby pilot 18 are positively positioned with respect to each other and with respect to ribbon extension 81 by a bracket 94 which is spot welded to plate 76, and by a clamp 96, which is attached as by a bolt to support member 70. One end of standby pilot 18 is located in a position so that the flame therefrom will ignite igniter pilot 16 and the other end has coupling means provided thereon for making connection to gas conduit 22. One end of igniter pilot 16 is located in a position so that the flame therefrom is directed upon the widened portion of ribbon extension 81 and some of the ports 11 provided in burner 12. Coupling means are provided at the other end of igniter pilot 16 for making connection to gas conduits 24 (FIG. 1) or 40 (FIG. 2).

The operation of the foregoing system is as follows:

It is assumed that the parts of the system are in the position shown in FIG. 1. The burner 12 is connected directly to burner cap 47, located on valve casing 42, by the mixing tube 13 thereby eliminating any piping or conduits between the burner 12 and the valve outlet 44. The burner 12 is disposed in a plane substantially parallel to mounting plate 76 so that some of its ports 11 are in a position adjacent to igniter pilot 16. The constantly burning pilot 18 is lighted, as by a match, and the burner 12 and the igniter pilot 16 are unlighted. The thermostatic valve 20 is in its closed position and the valve member 52, biased by spring 56, is in its closed position in engagement with valve seat 50.

To light the burner 12, the operator of the gas range initially depresses the knob 30 and rotates it to a preselected temperature thereby opening thermostatic valve 20. Under these conditions, gas flows from the manifold 10, through the thermally responsive valve 20, conduit 26, and into inlet 46 of the valve housing 42. Since the valve member 52 is closed against valve seat 50, the gas cannot pass to the burner 12. Concurrently with this flow of gas, gas will also flow from manifold 10 through thermally responsive valve 20, conduit 24, and into and through igniter pilot 16. The flame of the standby pilot 18 is positioned so that it will ignite this gas flowing from igniter pilot 16. The flame of the igniter pilot 16 is positioned so that it is directed toward some of the ports 11 of the burner 12 and against the underside of the widened portion of thermal element 81. The location of the flames at igniter pilot 16 and standby pilot 18 are shown in FIG. 2.

Prior to ignition of igniter pilot 16, the lever 80 is held or biased in its normal position of from 8° to 9° above the horizontal or top surface of plate 76 by the thermal element 81 as determined by its normal cool length. With lever 80 in this position, the operating rod 64 is held in a raised position with its upper end directly under and operatively engageable by the indented portion 84 of lever 80. Operating rod 64 is held in this raised position by the biasing force of spring 68 exerted on stem 60 to hold it out of engagement with valve member 52 and in abutment with the lower end of operating rod 64. When igniter pilot 16 is ignited, the heat of its flame will cause elongation of thermal element 81 longitudinal of its length, thereby causing lever 80 to rotate downwardly about its hinged attachment to mounting plate 76 engaging indented portion 84 with the upper end of operating rod 64. Spring 79 aids thermal element 81 in causing downward rotation of lever 80.

Continued downward rotation of lever 80 will cause downward movement of operating rod 64 in guide bearing 72 and downward movement of stem 60 therewith, engaging stem 60 with valve member 52. After engagement of stem 60 with valve member 52, continued downward rotation of lever 80 will cause valve member 52 to be moved toward its open position. Movement of valve member 52 toward its open position will continue so long as the flame from igniter pilot 16 continues to heat and cause elongation of thermal element 81. However, when lever 80 is rotated into engagement with stop lugs 92, continued elongation of thermal element 81 by the heat of the flame from igniter pilot 16 will not cause any further movement of valve member 52.

As soon as valve member 52 begins to move toward its open position, gas from manifold 10, the flow of which has been blocked by the closed position of valve member 52, will flow through chamber 48 into outlet 44, through the orifice in burner cap 47, and into mixing tube 13. This gas is mixed with air in mixing tube 13 and the air-gas mixture then flows into burner 12 and outwardly of burner 12 through burner ports 11. When the air-gas mixture issues from ports 11, it is immediately ignited by the flame of the burner ignition means, igniter pilot 16.

As long as igniter pilot 16 burns with an adequate ignition flame, it will heat thermal element 81 sufficiently to allow lever 80 to remain on stop lugs 92. Under these conditions, the valve member 52 is positioned to a full-open position and is capable of passing to the burner 12 such flow of gas as is permitted to flow from manifold 10 through thermostatic valve 20 as influenced by the temperature responsive bulb 28. As thermal element 81 is heated, it will expand rapidly, providing rapid opening of the valve member 52, since it is made of a relatively thin material which is in direct contact with the flame of igniter pilot 16. Rapid ignition of the air-gas mixture emitted from ports 11 is also provided, for gas flows immediately to inlet 46 when the valve 20 is moved to an open position and flow then to the burner is dependent entirely upon the rapidity of response of the automatic control device 14.

When the thermostatic valve 20 is moved to its closed position by rotation of knob 30, the flow of gas from manifold 10 to the igniter pilot 16 and to the burner 12 is stopped and the igniter pilot flame is promptly extinguished. Thermal element 81 will cool quickly thereby contracting and causing lever 80 to be rotated upwardly against the biasing pull of spring 79. The upward rotation of lever 80 will allow valve spring 56 to move the valve member 52 toward its closed position and stem 60 and operating rod 64 upwardly. When thermal element 81 cools sufficiently to allow valve member 52 to close against valve seat 50, upward movement of stem 60 and operating rod 64 will no longer be influenced by spring 56 but instead, at this point, spring 68 will move stem 60 upwardly out of engagement with valve member 52 and operating rod 64 upwardly to its normal raised position.

Rapid closing of valve member 52 against valve seat 50 is provided and this operation is dependent entirely upon the rapidity with which thermal element 81 cools to a predetermined temperature. It is to be understood that thermal element 81 is responsive only to the direct flame of igniter pilot 16 and not to ambient temperatures which may be encountered at the control device 14.

With the parts of the system arranged as shown in FIG. 2, the operation is identical to that described heretofore with respect to the system illustrated in FIG. 1, with the exception that the operator operates a gas cock 34 by means of a knob 36. Since FIG. 2 illustrates a broiler burner system requiring no temperature control, a gas cock 34 suffices, as is well known in the art, for admitting gas from manifold 10, into conduit 38. Since a gas cock 34 is utilized, conduit 24 (FIG. 1) can be eliminated and gas can be delivered directly to igniter pilot 16 from conduit 38 through branch conduit 40.

Figure 6:
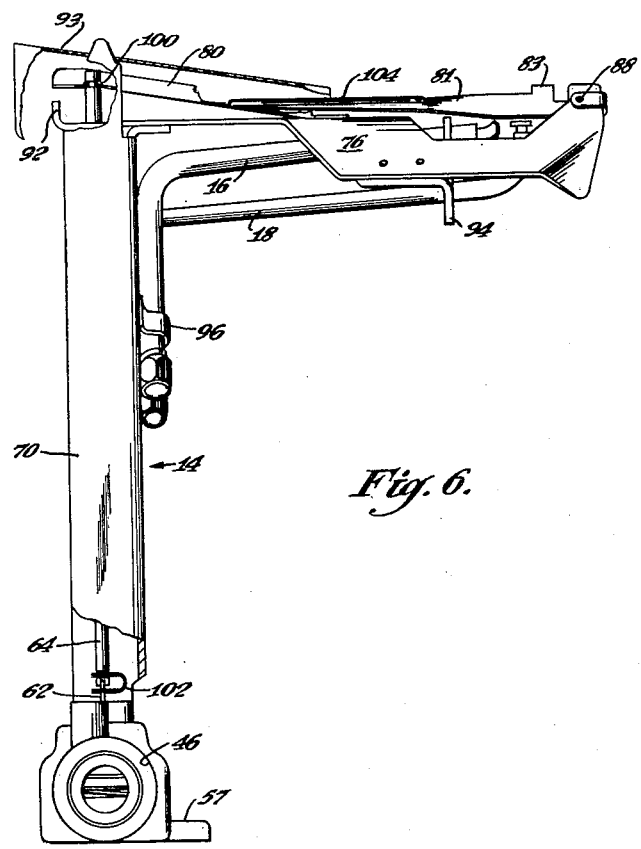
FIG. 6 is a view similar to FIG. 4, showing a modification of the automatic control device of this invention.

In the modification illustrated in FIG. 6, the upper end of operating rod 64 is secured in an opening provided in lever 81 by a limited swivel type connection indicated at 100. The lower end of operating rod 64 has a hole provided therein adapted to receive the upper end of stem 62 and these ends are connected by any suitable means such as a spring clip 102. Stem 62 is thus supported by the operating rod 64 and spring 68 and retaining member 66 can be eliminated. With the operating rod thus fixed at its upper and lower ends, the direction of its movement is necessarily determined and the bearings 72 can be eliminated from support structure 70.

Thermal element 81 is modified to prevent buckling longitudinal of its length when in a heated condition by making it U-shaped in cross-section for a portion of its length as indicated at 104. By thus modifying the thermal element 81, the spring 79 shown in the preferred embodiment can be eliminated.

In the operation of this modification with the igniter pilot 16 unignited, the lever 80 will be biased to its normal position of from 8° to 9° above the top surface of plate 76 by the thermal element 81. The operating rod 64 will be held in its raised position by lever 80 and the stem 62 will be held in a raised position out of engagement with valve member 52 by operating rod 64. When igniter pilot 16 is caused to be ignited, the flame therefrom will heat thermal element 81 causing it to expand. Expansion of thermal element 81 causes downward rotation of lever 80 about its hinged attachment to plate 76; downward movement to operating rod 64 and valve stem 62; and the eventual movement of valve member 52 to its open position. When lever 80 moves into engagement with stop lugs 92, movement of the valve member 52 ceases with lever 80 remaining on stop lugs 92 and valve member 52 remaining in the open position until the flame at igniter pilot 16 is extinguished. Extinguishment of the flame at igniter pilot 16 allows thermal element 81 to cool thus contracting to its normal length and causing upward movement of lever 80 about the hinged attachment to plate 76; upward movement of operating rod 64 and stem 62; and movement of valve member 52 to the closed position under the bias of spring 56.

In the event igniter pilot 16 is rendered inoperative due to a reduction or extinguishment of its flame, the operation heretofore described with respect to both embodiments takes place and valve member 52 closes upon valve seat 50. Safe operation of the appliance with which control device 14 is used is thereby provided, for not only must gas ignition means in the form of a flame at igniter pilot 16 be present to ignite the gas issuing from burner 12 before gas is admitted thereto, but it must also persist with sufficient flame to keep thermal element 81 heated during the entire operation of burner 12 or the gas supply thereto will be cut off.

If control device 14 is used in conjunction with a cooking operation where foods have a tendency to spatter grease or other matter, such as in the broiler burner system of FIG. 2, the flames at the igniter pilot 16 and the standby pilot 18 may become extinguished by this grease and allow the valve member 52 to close on valve seat 50 thus turning off the gas supply to burner 12 during the cooking operation. To eliminate this undesirable operation, the tab 83 on the thermal element 81 is positioned as close as possible to ports 11 of burner 12, as best illustrated in FIGS. 1 and 2, to act as a heat transfer for the igniter pilot 16. The flame issuing from ports 11 will maintain the tab 83 at an extreme temperature until the flame at igniter pilot 16 is rekindled to thus maintain the valve member 52 in an open position.

Stress on the heated thermal element 81 becomes a definite minimum when the valve member 52 is in its full open position with the lever 80 in engagement with stop lugs 92. This relaxation, or practically complete removal, of load from the highly heated thermal element 81 occurs during practically the entire time that the flame at the igniter pilot 16 exists. This largely eliminates the phenomena of creep and insures against any change in calibration of the control device 14 because of creep or warpage. The occurrence of any appreciable amount of creep in the thermal element 81, mounting plate 76, or the lever 80 would allow lever 80 to rotate downwardly in the direction required to open valve member 52. Creep anywhere in thermal element 81, mounting plate 76, or lever 80 would also be detrimental in that it would tend to lower the maximum ambient temperature level at which valve member 52 would be moved to its closed position.

It should be particularly pointed out that this automatic control device is versatile in application. The support member 70 and the operating rod 64 need only be changed in overall length in order to manufacture a unit of this nature to fit different size appliances. The same thermal element 81 with its associated operating mechanism and the same control unit assembly are employed regardless of whatever the overall length of members 70 and 64 may be. The time saving value of such a result, in the inspection, calibration, adjustment, manufacturing, and stocking of parts, will be particularly appreciated by those who employ volume production in their plants.

While the invention has been described specifically with an oven or broiler burner system of a domestic cooking range, it can be appreciated that the automatic control device could be utilized with any heating appliance.

Although specific embodiments of the invention have been shown and described, it will be apparent that many modifications may be made by those skilled in the art. Such modifications may be made in the details of construction and arrangement of parts without departing from the scope of the invention as set forth in the appended claims.

We claim:

1. In a temperature responsive control device actuator comprising a substantially rectangular lever portion and an integrally formed temperature responsive ribbon portion, said lever portion including a floor portion and a plurality of upwardly directed edge portions formed perpendicular to said floor portion for rendering said lever substantially rigid, said temperature responsive ribbon portion having one end integrally formed with said lever portion and extending longitudinally of said lever portion terminating in a free end, said temperature responsive portion also including a pair of flame impinging areas intermediate its ends, said flame impinging areas including a widened portion extending longitudinally of said ribbon portion intermediate the ends thereof, and a tab portion extending perpendicular to said ribbon portion adjacent the free end thereof.

2. In a temperature responsive valve actuator assembly having a frame, and a valve operating rod mounted in said frame for valve actuating movements; a one-piece metallic actuating element comprising an elongate rigid lever portion and an elongate ribbon portion integrally joined at one end to said lever portion at a location intermediate the ends of said lever portion, said ribbon portion projecting longitudinally from said lever portion beyond one end of said lever portion in an angular relationship thereto wherein the angle included between said ribbon portion and said one end of said lever portion is an acute angle, means securing said one end of said lever portion to said frame to support said lever portion for swinging movement about a pivotal axis, means fixedly securing the other end of said ribbon portion to said frame in a spaced relationship to said one end of said lever portion such that longitudinal contraction of said ribbon portion is operable to swing said lever portion about said pivotal axis in a direction increasing said acute angle, a transversely enlarged portion on said ribbon portion defining a heat impingement area for inducing longitudinal expansion or contraction of said ribbon portion in response to an increase or decrease in heat applied thereto, and means on the other end of said lever portion for transmitting pivotal movement of said lever portion to said valve operating rod.

3. In a valve actuator assembly as defined in claim 2; spring means coupled between said lever portion and said frame for resiliently biasing said lever portion in pivotal movement in a direction exerting tension on said ribbon portion.

4. In a temperature responsive valve actuator assembly as defined in claim 2; the further improvement wherein said ribbon portion is formed with a U-shaped transverse cross-section.

References Cited in the file of this patent

UNITED STATES PATENTS

| | | |
|---|---|---|
| 532,638 | Clamond | Jan. 15, 1885 |
| 875,183 | Kent | Dec. 31, 1907 |
| 1,084,911 | Swift | Jan. 20, 1914 |
| 1,525,914 | Cakow | Feb. 10, 1925 |
| 1,984,444 | Thornhill | Dec. 18, 1934 |
| 2,122,986 | Mason | July 5, 1938 |
| 2,185,436 | Gordon | Jan. 2, 1940 |
| 2,192,629 | Beam | Mar. 5, 1940 |
| 2,295,876 | Taylor | Sept. 15, 1942 |
| 2,478,496 | Maynard | Aug. 9, 1949 |
| 2,483,939 | Schickler | Oct. 4, 1949 |
| 2,487,963 | Cerny et al. | Nov. 15, 1949 |